(12) United States Patent
Wengrovitz

(10) Patent No.: US 8,731,583 B2
(45) Date of Patent: May 20, 2014

(54) INTERACTIVE ID SYSTEM USING MOBILE DEVICES

(75) Inventor: Michael S. Wengrovitz, Concord, MA (US)

(73) Assignee: Alcatel Lucent, Paris (FR)

(*) Notice: Subject to any disclaimer, the term of this patent is extended or adjusted under 35 U.S.C. 154(b) by 660 days.

(21) Appl. No.: 12/651,913

(22) Filed: Jan. 4, 2010

(65) Prior Publication Data
US 2011/0165859 A1 Jul. 7, 2011

(51) Int. Cl.
H04W 24/00 (2009.01)
H04M 1/66 (2006.01)

(52) U.S. Cl.
USPC .............................. 455/456.3; 455/411

(58) Field of Classification Search
USPC ............ 455/41.2, 456.3, 411, 403, 414.1
See application file for complete search history.

(56) References Cited

U.S. PATENT DOCUMENTS

| 7,340,214 | B1 * | 3/2008 | Hamberg | 455/41.2 |
| 2005/0079817 | A1 * | 4/2005 | Kotola et al. | 455/41.2 |
| 2005/0255839 | A1 * | 11/2005 | Perttila | 455/419 |
| 2007/0123215 | A1 * | 5/2007 | Wang et al. | 455/411 |

OTHER PUBLICATIONS

Lopez-De-Ipina, "Touch Computing: Simplifying Human to Environment Interaction through NFC Technology," Internet: http://paginaspersonales.deusto.es/dipina/publications/dipinaJornadas, Internet Citation 2007, pp. 1-12 XP002534871.
International Search Report and Written Opinion mailed Aug. 24, 2011 for PCT/US2011/020005, 8 pages.

* cited by examiner

Primary Examiner — George Eng
Assistant Examiner — Joseph Dean, Jr.
(74) Attorney, Agent, or Firm — Garlick & Markison; Holly L. Rudnick

(57) ABSTRACT

An interactive ID system enables dynamic delivery of content to a mobile device of a person on a campus. The system includes an interactive ID server coupled to receive a tag ID of a near field communication (NFC) tag and a reader ID of an NFC reader in communication with the NFC tag, in which one of the NFC tag and the NFC reader is on the mobile device and either the tag ID or the reader ID is associated with the person. The interactive ID server determines and communicates the content provided to the mobile device.

18 Claims, 5 Drawing Sheets

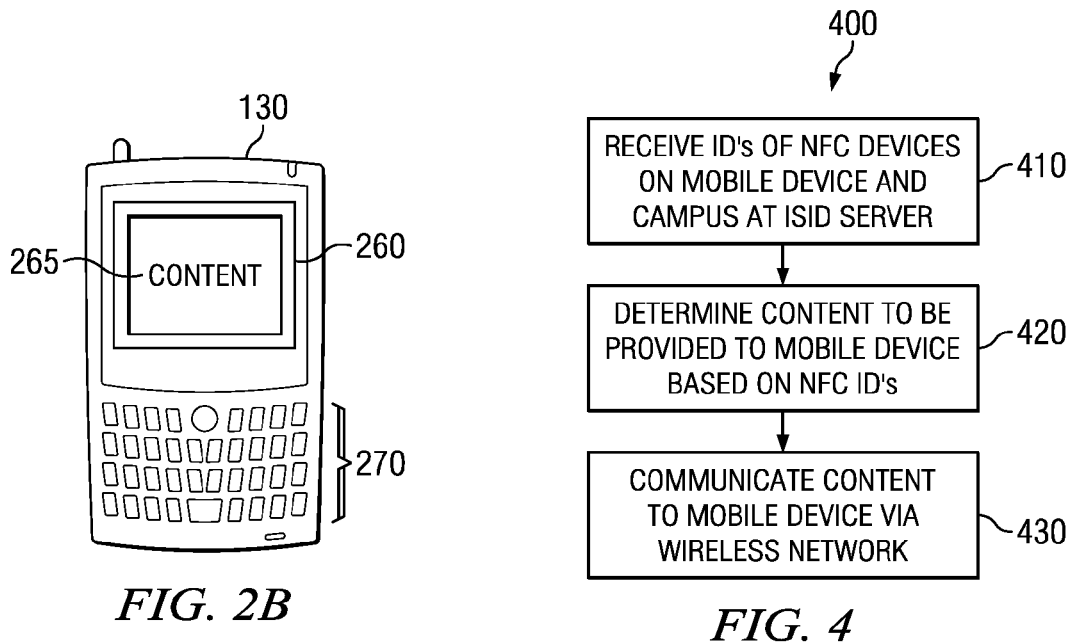
FIG. 2B
FIG. 4
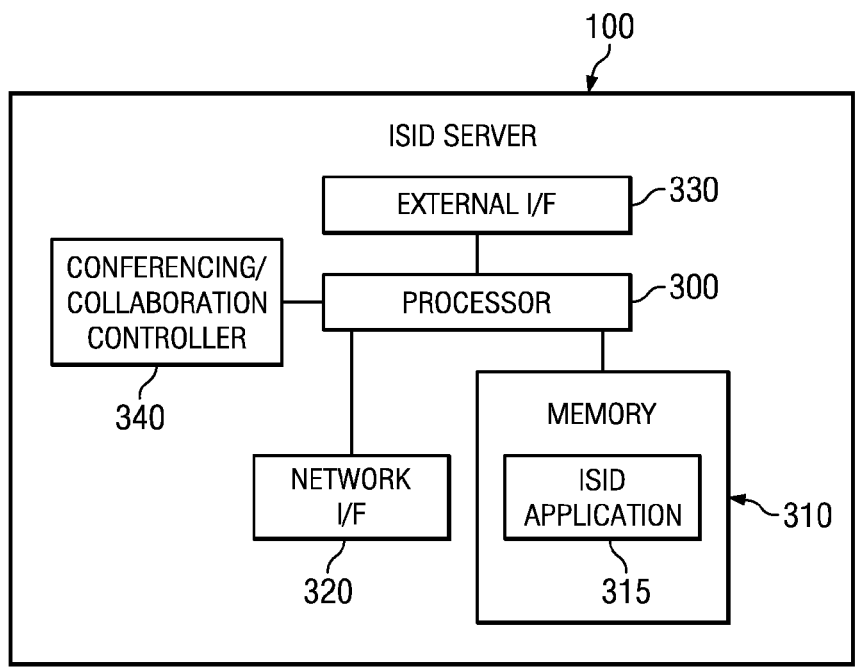
FIG. 3

INTERACTIVE ID SYSTEM USING MOBILE DEVICES

BACKGROUND OF THE INVENTION

1. Technical Field of the Invention

The present invention relates in general to communication systems and in particular, to campus networks with near field communication devices.

2. Description of Related Art

Students on university campuses typically use their student identity (ID) cards to gain access to dormitories, classrooms, student centers, and other campus facilities. These plastic ID cards contain a magnetic stripe or a near-field-communication (NFC) chip that when swiped or touched to an existing campus reader causes a door access control system to grant access and open the door. Data on the magnetic stripe or the NFC-card may also be linked to the student's identification to trigger payments for purchases. For example, a student may use his/her card to pay for a meal in the cafeteria or to purchase books in the campus bookstore.

However, in existing student ID systems, the information flow caused by touching the badge to a reader is unidirectional, i.e. from the student to the system. In fact, although most students already carry mobile devices, and many of these are smart-phones capable of browsing the web and receiving immediate and asynchronous alerts, such as text messages and push-notifications, in current student ID systems, no information is sent back to the student relating to the touch of his/her identification card to a reader. Thus, current student ID systems do not provide additional information that can be automatically delivered in a real-time and timely way back from the system to the student.

In a different context, mobile devices have been proposed for making purchases in coffee shops by displaying 2D barcodes read by point-of-sale readers. In addition, next-generation mobile devices have been proposed that contain NFC readers capable of reading tags on posters and billboards for delivery of advertisements. However, there has been no coupling or integration of these NFC devices to the existing legacy door access and control systems typically found on almost every university and college campus worldwide.

SUMMARY OF THE INVENTION

An interactive ID server, in one embodiment of the present invention, includes an interface coupled to a network to receive a tag ID of a near field communication (NFC) tag and a reader ID of an NFC reader in communication with the NFC tag. In this embodiment, either the NFC tag or the NFC reader is on a mobile device of an authorized person on a campus, and either the tag ID or the reader ID is associated with the authorized person. The interactive student ID server further includes a processor operable to determine content to be provided to the mobile device of the authorized person based on the tag ID and the reader ID and to communicate the content to the mobile device. The content may be, for example, a phone call, a recorded message, a uniform resource locator (URL) of a website or other data that is communicated to the mobile device via a telephone call, short message system (SMS) message, a data push notification message or other similar communication mechanism.

In one embodiment, the interface includes a network interface coupled to a local area network (LAN) of the campus and an external interface coupled to an additional network. For example, the additional network can include a wireless access network for communicating with the mobile device and the processor can communicate the content to the mobile device via the external interface. The network interface is also coupled to either the NFC reader or the NFC tag via the LAN and is further coupled to a legacy ID server of the campus via the LAN.

In an exemplary embodiment, the network interface is operable to receive the tag ID and the reader ID from the NFC reader coupled to the LAN. In another exemplary embodiment, the external interface is operable to receive the tag ID and the reader ID from the NFC reader on the mobile device, and the network interface is coupled to provide the tag ID and the reader ID to the legacy ID server. In yet another embodiment, the processor is further operable to determine parameters of the content from the tag ID and the reader ID and identify data needed to satisfy the parameters, and the network interface is operable to retrieve at least a portion of the data for the content from the legacy ID server.

An interactive identity (ID) system, in another embodiment of the present invention, includes a first near field communication (NFC) device coupled to a local area network of a campus, a mobile device of an authorized person of the campus having a second near field communication (NFC) device for communicating with the first NFC device and an interactive ID server coupled to the local area network and an additional network external to the local area network, in which the additional network includes a wireless access network for communicating with the mobile device. In this embodiment, one of the first and second NFC devices is an NFC tag and the other is an NFC reader and the interactive ID server is operable to receive a tag ID of the NFC tag and a reader ID of the NFC reader when the NFC reader is in communication with the NFC tag. Either the tag ID or the reader ID is associated with the authorized person. The interactive ID server is further operable to determine content to be provided to the mobile device of the authorized person based on the tag ID and the reader ID and to communicate the content to the mobile device via the wireless access network.

A method, in yet another embodiment of the invention, is provided for dynamic delivery of content to a mobile device on a campus. The method includes receiving a tag identity (ID) of a near field communication (NFC) tag and a reader ID of an NFC reader in communication with the NFC tag at an interactive ID server on the campus, in which one of the NFC tag and the NFC reader is on the mobile device. The method further includes determining content to be provided to the mobile device based on the tag ID and the reader ID and communicating the content to the mobile device via a wireless access network.

BRIEF DESCRIPTION OF THE DRAWINGS

A more complete understanding of the present invention may be obtained by reference to the following detailed description when taken in conjunction with the accompanying drawings wherein:

FIG. 2B is a pictorial representation of a mobile device for use within the interactive student ID system, in accordance with embodiments of the present invention;

FIG. 3 is a block diagram of an exemplary interactive student ID server, in accordance with embodiments of the present invention;

FIG. 4 is a flowchart illustrating an exemplary process for dynamic delivery of content to a mobile device on a college campus, in accordance with embodiments of the present invention;

DETAILED DESCRIPTION OF THE DRAWINGS

In accordance with embodiments of the present invention, an Interactive Student ID (ISID) system is provided whereby a near-field communication device (NFC) is fixed to a mobile device or smart phone of a student or other authorized person on a college campus. Thus, instead of touching a plastic card to a reader, students use their mobile devices or smart phones, thereby triggering not only one-way legacy operations, such as opening doors or making purchases on campus, but also causing dynamic content to be delivered to the mobile device, thereby allowing the student to interact via two-way data operations and to make informed decisions, choices, and selections.

For example, when making a purchase in a bookstore or cafeteria using the NFC device on the mobile device, a student can be immediately presented with current balances of different accounts via the mobile device, thereby enabling the student to select the most appropriate account for making a payment. As another example, when touching the NFC device on the mobile device to an NFC device on a classroom's door, not only can the door be opened, but the student can also receive an automatic and immediate notification on his/her mobile device with links for downloading today's classroom content. In a further example, when touching the NFC device on the mobile device to an NFC device on a dormitory door, not only can the door be opened, but the student can also receive dynamic web content, such as YouTube links or other dynamic web links related to current dormitory activities and events or interfaces to Facebook, Twitter, and other social networks for timely status updates and other information. The ISID system may also generate the status updates on Facebook, Twitter, etc., and then report the status updates to the student via the mobile device.

The ISID system efficiently integrates existing mobile devices and legacy door access control systems in order to avoid forklift replacement of legacy phones and legacy door access control systems, thereby minimizing cost and providing a practical solution. Thus, campuses can retain their existing access control systems and achieve improved functionality via system add-ons and upgrades to their legacy infrastructure. Likewise, students, staff and other authorized persons can keep their existing mobile devices and take advantage of the improved functionality.

Figure 1:
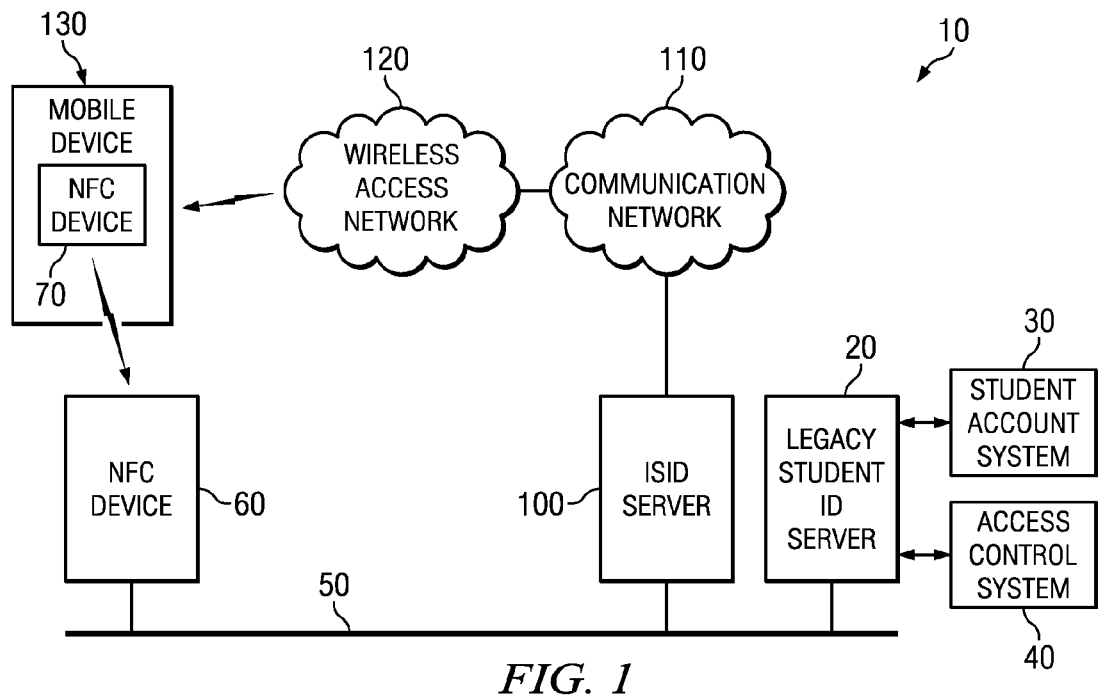
FIG. 1 illustrates an exemplary interactive student ID system, in accordance with embodiments of the present invention.

FIG. 1 illustrates an exemplary interactive student identity (ID) system 10, in accordance with embodiments of the present invention. The interactive student ID system 10 includes an interactive student ID (ISID) server 100 implemented within a legacy student ID system on a college campus. The legacy student ID system includes a legacy student ID server 20 coupled to a student account system 30 and an access control system 40 to provide legacy one-way services. The legacy student ID system further includes a near field communication (NFC) device 60 coupled to the legacy student ID server 20 via a local area network (LAN) of the college campus.

As used herein, the term "NFC" refers to a short-range, high frequency wireless communication technology that enables the exchange of data between devices over about a small (e.g., 20 centimeter or less) distance. NFC communicates via magnetic field induction, where two loop antennas are located within each other's near field, effectively forming an air-core transformer, and typically operates within the 125 kHz frequency band and/or the 13.56 MHz frequency band.

An NFC tag stores identification data for use in identifying the authorized person, while an NFC reader operates as an interrogator to retrieve the identification data stored on the NFC tag. The NFC tag may be an active tag that includes an internal power source, such as a battery, and/or a passive tag that does not contain an internal power source, but instead is remotely powered by the NFC reader.

As described above, communication between the NFC reader and the NFC tag is enabled by radio frequency (RF) signals. In general, to access the identification data stored on an NFC tag, the NFC reader generates a modulated RF interrogation signal designed to evoke a modulated RF response from a tag. The RF response from the tag includes the coded identification data stored in the NFC tag. The NFC reader decodes the coded identification data to identify the person associated with the NFC tag. For passive tags, the NFC reader also generates an unmodulated, continuous wave (CW) signal to activate and power the tag during data transfer.

The NFC device 60 coupled to the LAN 50 of the college campus may be, for example, an NFC tag or an NFC reader, that is capable of communicating with another NFC device 70 when placed in close proximity therewith. For example, if NFC device 70 is an NFC tag and NFC device 60 is an NFC reader, after coming into close proximity, the NFC reader 60 communicates with the NFC tag 70 to retrieve the identification data (i.e., tag ID) that identifies the authorized person associated with the NFC tag 70. The NFC reader 60 then provides the tag ID, along with the reader ID of the NFC reader 60, to the legacy student ID server 20 via the LAN 50. The legacy student ID server 20 communicates with the student account system 30 and/or the access control system 40 to provide legacy services, such as enabling the student to make a purchase or opening a door to enable the student to gain access to a campus facility. For point-of-sale terminals incorporating an NFC reader 60, the NFC reader 60 can further be programmed to provide a sale amount (cost of goods/services to be purchased by student) to the legacy student ID server 20 as either part of the reader ID or as data in addition to the reader ID.

In accordance with embodiments of the present invention, to provide two-way (interactive) data operations, the NFC device 70 is included on a mobile device 130 of a student or other authorized person of the college campus (e.g., professor, staff member, etc.), and the tag ID and the reader ID are further provided to the ISID server 100, which triggers automatic delivery of real-time interactive content to the mobile device 130. By way of example, but not limitation, the mobile device 130 may include any type of mobile or wireless device, such as a cell phone, a personal digital assistant (PDA), laptop computer or other similar mobile device.

To deliver the content to the mobile device 130, the ISID server 100 is coupled to another network which may be external to the LAN 50. For example, as shown in FIG. 1, the ISID server 100 is coupled to a wireless access network 120. The wireless access network 120 includes any network capable of providing wireless connectivity to the mobile device 130. By way of example, but not limitation, the wireless access network 120 can include one or more of a GSM network, a CDMA network, a UMTS network, a GPRS network, a WiFi network, a WiMax network, an LTE network or any other similar network.

In FIG. 1, the ISID server 100 is further coupled to a communication network 110, such as a packet-switched and/or circuit-switched network. For example, the communication network 110 may include, but is not limited to, one or more of an Internet Protocol (IP), Multiprotocol Label Switching (MPLS), Asynchronous Transfer Mode (ATM), Ethernet or PSTN. The ISID server 100 may couple to the communication network 110 to provide data to applications-enabled service providers to determine content to be provided to the mobile device 130 and/or to assist with delivery of the content to the mobile device 130. Thus, the content may be delivered to the mobile device 130 via the communication network 110 and the wireless access network 120. However, although the ISID server 100 is shown coupled to the wireless access network 120 via the communication network 110, in other embodiments, the ISID server 100 may also be coupled directly to the wireless access network 120. For example, the ISID server 100 may act as a wireless access point within the wireless access network 120.

In embodiments in which NFC device 60 is an NFC reader and NFC device 70 is an NFC tag, the NFC tag 70 can be attached to the back surface of the mobile device 130 to enable efficient communication with the NFC reader 60. The NFC tag 70 should be durable and robust, since the mobile device 130 may be removed and inserted into a carrying case, pocket, purse, backpack or other carrying apparatus many times during its course of usage. However, since magnetic induction can occur through leather, plastic, rubber and other materials, there is typically no need for the student to remove his/her mobile device from the carrying case to use the NFC tag 70. Although a single, small form-factor NFC tag 70 is depicted, NFC tags having larger or smaller surface areas, operating at different frequencies, and perhaps containing not only the NFC chip but also barcodes, photographs, etc are envisioned in other embodiments of the invention.

In an exemplary operation, after coming into close proximity, the NFC reader 60 communicates with the NFC tag 70 to retrieve the identification data (i.e., tag ID) that identifies the authorized person associated with the NFC tag 70. The NFC reader 60 then provides the tag ID, along with the reader ID of the NFC reader 60 to not only the legacy student ID server 20 via the LAN 50, but also the ISID server 100. The legacy student ID server 20 performs traditional one-way legacy services, as described above, whereas the ISID server 100 causes dynamic content to be delivered to the mobile device 130, thereby allowing the student to interact with the ISID system 10 via two-way data operations. Examples of content include a recorded voice message, interaction with a live operator, a uniform resource locator (URL) of a website containing additional information or other types of data.

Since the NFC tag 70 is attached to the mobile device 130, and the NFC reader 60 is located within the campus infrastructure, the mobile device 130 is typically completely unaware that the communication has happened, and may be in an idle or sleep mode. To ensure the timely and asynchronous delivery of the content, the ISID system 10 provides different methods for awakening the idle mobile device and for initiating two-way interactivity in a timely manner. In one method, the ISID server 100 places a telephone call to mobile device 130. The telephone number of the phone call is linked to the tag ID, which is associated to the student, and the content of the telephone call is linked to the reader ID (and optionally the tag ID). In this way, the student might hear a recording, interact with an interactive voice response (IVR) system, be joined into a conference call etc.

In another method, the ISID delivers a Short Message System (SMS) message to the mobile device 130. Again, the telephone number of the mobile device 130 for the SMS is linked to the tag Id, which is associated to the student, whereas the content of the SMS is linked to the reader ID (and optionally the tag ID). In this way, an asynchronous text message can be delivered to the mobile device. The contents of this SMS message might be a URL or web link to dynamic content. For example, the SMS message might contain a link to YouTube multimedia content describing current dormitory events, or happenings in the student center. As another example, the SMS message may contain a URL or Tiny-URL causing automatic login to a portal summarizing the student's account balances, meal points, campus-bucks, etc.

In one embodiment, standard SMS services might be used with campus-based or Internet-based SMS gateways and delivery services. In another embodiment, special arrangements can be made with mobile device network service provider to deliver ISID-related SMS messages at no-cost, or with bulk-cost, or via other special business arrangements between the network service provider and the university. The network service provider might also enable, via an applications-enabled network or other means, delivery of these special SMS messages with higher priority delivery times, so as to minimize latency between the time a reader is touched and the time is takes to deliver the text message containing links to the mobile device.

In yet another method, the ISID server 100 can exploit a data notification service that delivers asynchronous events to mobile devices. For example, the ISID might use the Apple Push Notification Services (APNS)™ to efficiently deliver push messages to mobile devices. After NFC communication, the ISID server 100 can trigger the delivery of such a notification to the mobile device 130. Upon acknowledgment of the alert, which can be received even if the mobile device is in its idle or sleep mode, the student's mobile device would automatically browse to a specific URL designated in the APNS message.

In another embodiment, NFC device 60 is an NFC tag and NFC device 70 is an NFC reader. In this embodiment, the NFC reader 70 can be either externally attached to the mobile device 130 or can be integrated into the mobile device 130. If the NFC reader 70 is integrated into the mobile device 130, the NFC reader 70 may be programmed to provide additional functionality to the user, such as synchronization with a personal computer (PC) or other type of functionality.

In an exemplary operation, after coming into close proximity, the NFC reader 60 on the mobile device 130 communicates with the NFC tag 70 to retrieve the identification data (i.e., tag ID) that identifies the campus article (i.e., door, campus point-of-sale terminal, etc.) associated with the NFC tag 70. The NFC reader 60 then provides the tag ID, along with the reader ID of the NFC reader 60, to the ISID server 100 via the wireless access network 120. The ISID server 100 communicates the tag ID and the reader ID to the legacy student ID server 20 via the LAN 50. The legacy student ID server 20 performs traditional one-way legacy services, as described above, whereas the ISID server 100 causes dynamic content to be delivered to the mobile device 130 via the wireless access network 120.

Figure 2A:
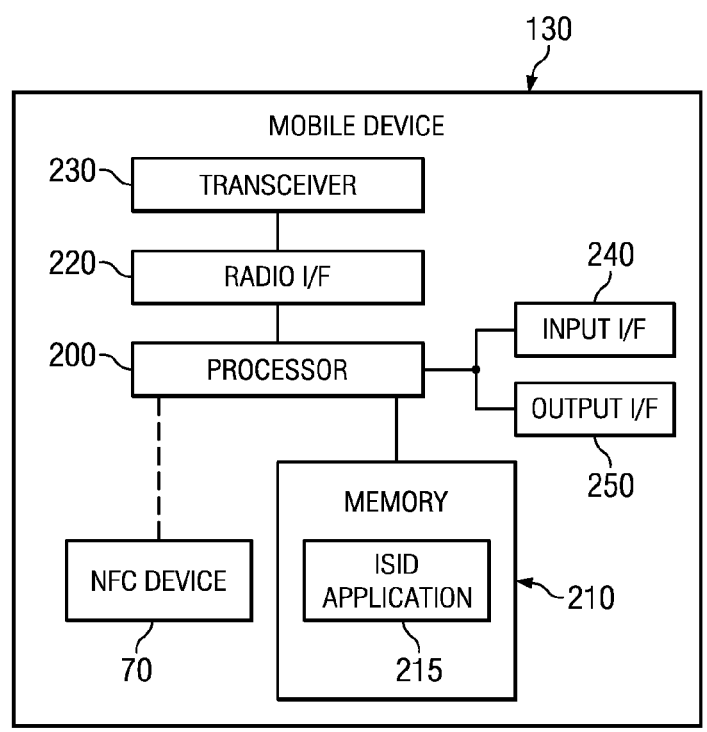
FIG. 2A is a block diagram of exemplary mobile device for use within the interactive student ID system, in accordance with embodiments of the present invention.

FIG. 2A is a block diagram of exemplary mobile device 130 for use within the interactive student ID system, in accordance with embodiments of the present invention. The mobile device 130 includes a processor 200, memory 210, radio interface 220, transceiver 230, input and output interfaces 240 and 250 and NFC device 70. Processor 200 and memory 210 execute instructions of communication functions that are typically performed by the mobile device 130. For example, the processor 200 can execute communication functions in accordance with a particular cellular telephone standard.

The NFC device 70 may be externally attached to the mobile device 130 or may be integrated within the mobile device 130. In embodiments in which the NFC device 70 is an NFC reader integrated into the mobile device 130, the memory 210 can maintain an ISID application 215 that may be downloadable from the network, such as from an on-line application store on the Internet. The processor 200 is further coupled to the memory 210 to execute instructions of the ISID application 215. For example, the processor 200 can execute instructions of the ISID application 215 to cause the NFC reader 70 to communicate with an NFC tag on campus to retrieve the tag ID and to provide the tag ID and reader ID to the ISID system on campus to enable legacy services and new interactive content services to be provided to the user of the mobile device 130.

The radio interface 220 provides a connection to the wireless access network (shown in FIG. 1) via transceiver 230 to transmit and/or receive voice and/or data to/from the ISID system. For example, the radio interface 220 allows data to be received from and sent to transceiver 230. For data received from transceiver 230 (e.g., inbound data), the radio interface 220 provides the data to the processor 200 for further processing and/or routing to output interface 250. Output interface 250 provides connectivity to an output device such as a display, monitor, speakers, etc., such that the received data may be displayed (viewed and/or heard). Radio interface 220 also provides data from processor 200 to transceiver 230. Processor 200 may receive the outbound data from an input device such as a keyboard, keypad, microphone, etc., via input interface 240 or generate the data itself. For data received via input interface 240, processor 200 may perform a communication function on the data and/or route it to transceiver 230 via radio interface 220.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

FIG. 2B is a pictorial representation of a mobile device 130 for use within the interactive student ID system, in accordance with embodiments of the present invention. The mobile device 130 includes a display 260 and a keypad input device 270. The display 260 and keypad 270 form a graphical user interface that enables a user of the mobile device 130 to view content 265 received from the ISID system on the display 260 and perform one or more actions based on the content 265. For example, the user can manipulate arrow/toggle keys or other keys on the keypad 270 to select a particular URL contained within the content 265 to cause the mobile device 130 to navigate to the website associated with the selected URL.

FIG. 3 is a block diagram of an exemplary interactive student ID (ISID) server 100, in accordance with embodiments of the present invention. The ISID server 100 includes a processor 300, memory 310, network interface 320 and external interface 330. The network interface 320 is coupled to a local area network (LAN) of the college campus, while the external interface 330 is coupled to another network external to the LAN. For example, the external interface 330 can be coupled to a wireless access network to enable the ISID server 100 to deliver content to mobile devices of students and campus personnel.

The memory 310 maintains an ISID application 315, and the processor 300 is further coupled to the memory 310 to execute instructions of the ISID application 315. For example, the processor 300 can execute instructions of the ISID application 315 to receive a tag ID and reader ID from a respective NFC tag and NFC reader, one of which is associated with an authorized person on a college campus, and the other of which is associated with an article or other object on the college campus. In embodiments in which the NFC reader is coupled to the LAN, the tag ID and reader ID can be received via the network interface 320. In embodiments in which the NFC reader is integrated with a mobile device, the tag ID and reader ID can be received via the external interface 330.

The processor 300 can further execute instructions of the ISID application 315 to determine particular content to be delivered to a mobile device of the authorized person based on the tag ID and the reader ID and to deliver the content to the mobile device. In an exemplary operation, the memory 310 further maintains a listing of mobile device telephone numbers and associated tag ID's or reader ID's. The processor 300 can access the memory 310 to identify the telephone number of the mobile device from the tag ID or reader ID.

In one embodiment, the processor 300 uses the retrieved telephone number to place a telephone call to the mobile device via the external interface 330. For example, the processor 300 can initiate a telephone call between the mobile device and a conferencing/collaboration controller 340 to enable the user of the mobile device to hear a pre-recorded message. The conferencing/collaboration controller 340 can be located within the ISID server 100 (as shown) or external to the ISID server 100. If within the ISID server 100, administrators or other authorized personnel can dial into the ISID server 100 to record messages on the conferencing/collaboration controller 340 and associate the recorded messages with particular tag ID's and/or reader ID's. For example, a professor or other administrator can pre-record a message for students to hear upon entering the classroom (i.e., if class has been canceled or rescheduled to a different place/time) and the student can hear the message upon entering the classroom.

The conferencing/collaboration controller 340 may further provide interactive voice response (IVR) services to enable a user of the mobile device to provide responses to the ISID server 100. For example, upon hearing that class has been canceled, the user may be prompted to enter "1" to be connected to the professor or another administrator on campus to answer additional questions. As another example, the conferencing/collaboration controller 340 may enable the processor 300 to initiate a conference call between the mobile device and another party or join the mobile device to an ongoing conference call. For example, the processor 300 can issue suitable Application Programming Interface (API) commands to the conferencing/collaboration controller 340 (internal or external to the ISID server 100) to dial-out to the mobile device and other parties. The conferencing/collaboration controller 340 may be implemented in hardware and/or software.

In another embodiment, the processor 300 uses the retrieved telephone number of the mobile device to deliver a Short Message System (SMS) message or other type of text message to the mobile device. The contents of the SMS message might be a URL or web link to dynamic content. In yet another embodiment, the processor 300 uses the retrieved telephone number of the mobile device to deliver a data notification message to the mobile device. For example, the data notification message may cause the student's mobile device to automatically browse to a specific URL designated in the data notification message.

FIG. 4 is a flowchart illustrating an exemplary process 400 for dynamic delivery of content to a mobile device on a college campus, in accordance with embodiments of the present invention. The process begins at block 410, where a tag identity (ID) of a near field communication (NFC) tag and a reader ID of an NFC reader in communication with the NFC tag is received at an interactive student ID (ISID) server on the college campus. Either the NFC tag or the NFC reader is on the mobile device. At block 420, the ISID server determines content to be provided to the mobile device based on the tag ID and the reader ID, and at block 430, the ISID server communicates the content to the mobile device via a wireless access network.

Figure 5A:
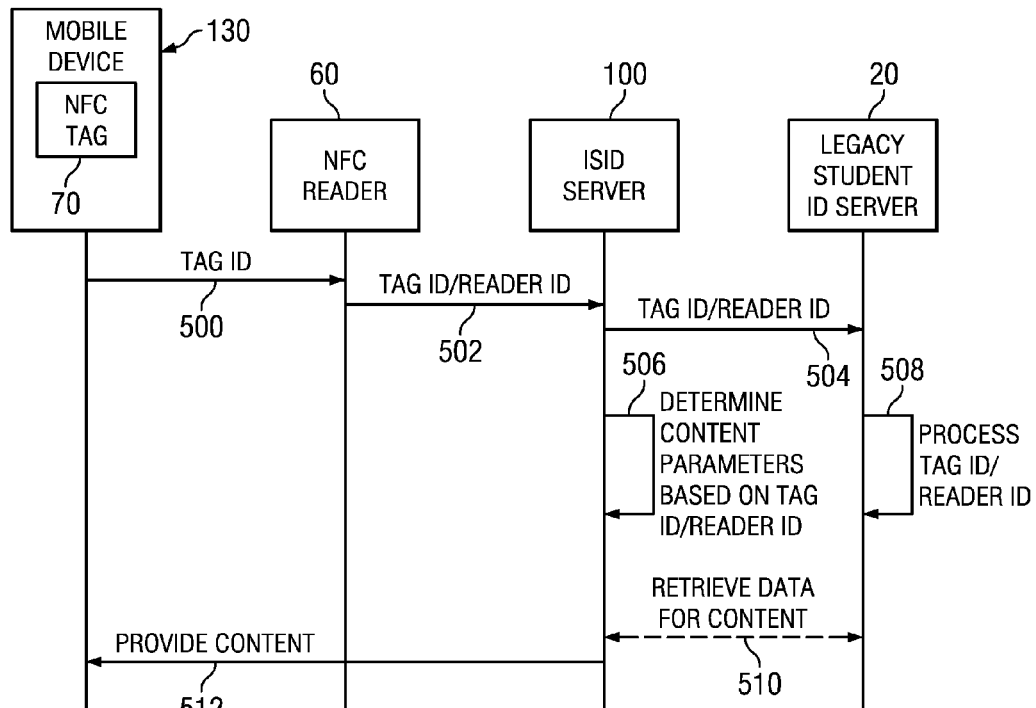
FIGS. 5A-5C illustrate various exemplary mechanisms for integrating the interactive student ID server within a legacy student ID system, in accordance with embodiments of the present invention.
Figure 5B:
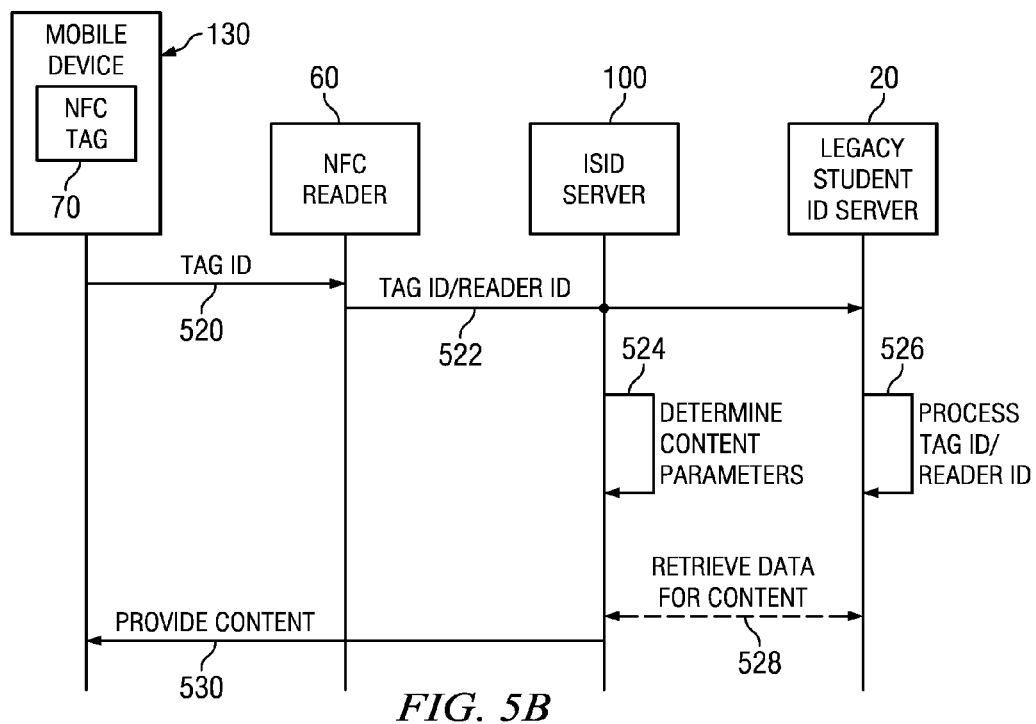
Figure 5C:
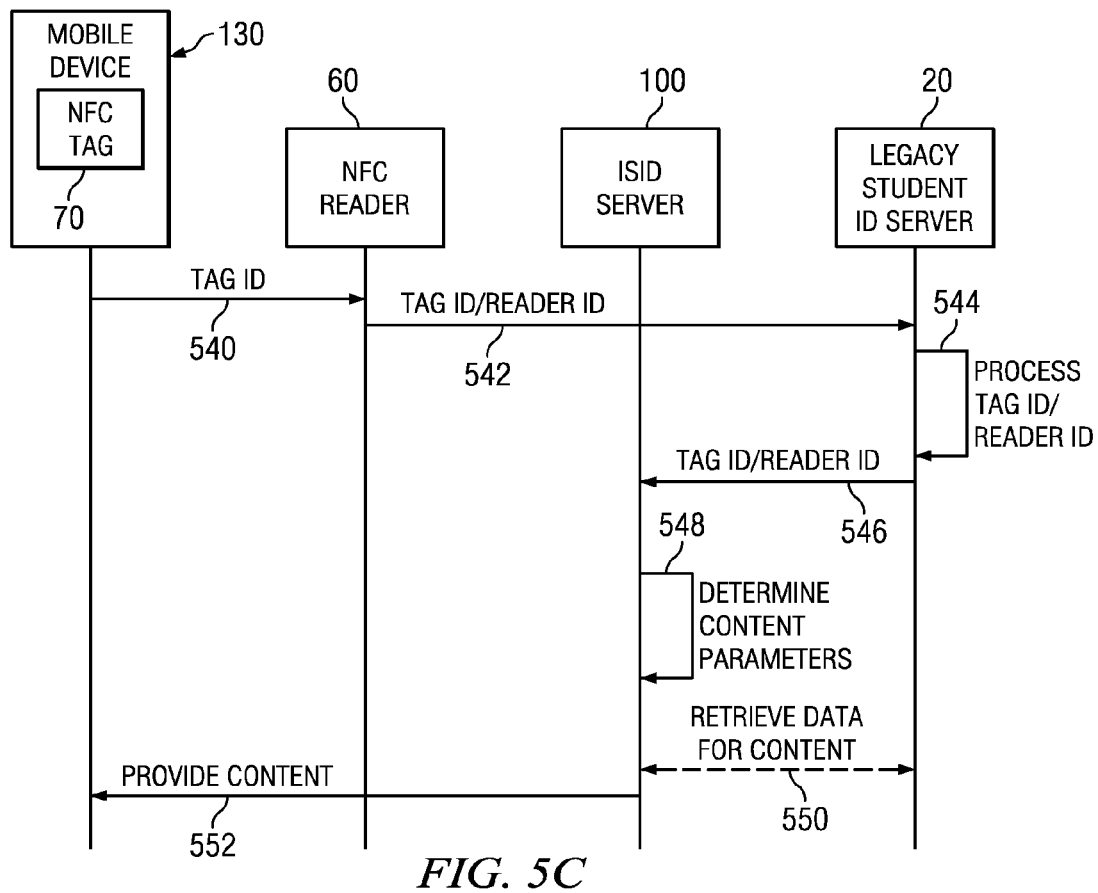

Turning now to FIGS. 5A-5C, various exemplary mechanisms for integrating the interactive student ID server within a legacy student ID system are illustrated, in accordance with embodiments of the present invention. In FIGS. 5A-5C, the NFC tag 70 is attached to the mobile device 130 of the student and the NFC reader 60 is included within the LAN of the college campus and is coupled to the ISID server 100 via the LAN.

In FIG. 5A, the ISID server 100 is coupled to the LAN (IP network) to act as a "man-in-the-middle" element. Thus, in FIG. 5A, at step 500, when the NFC tag 70 provides the tag ID to the NFC reader, the NFC reader 60 transmits the tag ID and reader ID to the legacy student ID server 20. At step 502, the ISID server 100 intercepts the tag ID and reader ID, and at step 504, the ISID server 100 relays the tag/reader ID data towards the legacy student ID server 20. This type of interception and relay typically requires the ISID server 100 to understand and decode the IP protocol utilized by the legacy system, and may further require the ISID server 100 be provided with any decryption keys and methods if the tag/reader ID data is encrypted.

Once the tag ID and reader ID are received by the ISID server 100, at step 506, the ISID server 100 determines the parameters of the content to be provided to the mobile device 130 based on the tag ID and reader ID. For example, the ISID server 100 may determine that the content to be delivered to the mobile device 130 includes the current student account balances of the student associated with the mobile device 130. In addition, once the tag ID and reader ID are received by the legacy student ID server 20, at step 508, the legacy student ID server 20 processes the tag ID and reader ID to provide legacy services, such as enabling the student to make a purchase or opening a campus door. Thereafter, at step 510, the ISID server 100 may optionally communicate with the legacy student ID server 20 to retrieve any data necessary for the content. For example, the ISID server 100 may optionally communicate with the legacy student ID server 20 to retrieve the student account balances. Once the content has been completed, at step 512, the ISID server 100 provides the content to the mobile device 130.

FIG. 5B depicts another similar IP-based integration scheme in which IP data (tag ID and reader ID) is split, via LAN data switch port mirroring or other means, so that the tag ID and reader ID data contained in the IP packets simultaneously travels to both the ISID server 100 and the legacy student ID server 20. Thus, in FIG. 5B, at step 520, when the NFC tag 70 provides the tag ID to the NFC reader 60, at step 522, the NFC reader 60 transmits the tag ID and reader ID as IP data packets in a parallel fashion to both the ISID server 100 and the legacy student ID server 20. The ISID server 100 receives the tag ID and reader ID data via sniffed IP data packets from a promiscuous data switch port.

Again, as in FIG. 5A, once the tag ID and reader ID are received by the ISID server 100, at step 524, the ISID server 100 determines the parameters of the content to be provided to the mobile device 130 based on the tag ID and reader ID. In addition, once the tag ID and reader ID are received by the legacy student ID server 20, at step 526, the legacy student ID server 20 processes the tag ID and reader ID to provide legacy services, such as enabling the student to make a purchase or opening a campus door. Thereafter, at step 528, the ISID server 100 may optionally communicate with the legacy student ID server 20 to retrieve any data necessary for the content, and at step 530, the ISID server 100 provides the content to the mobile device 130. Again, this mechanism may require that the ISID server 100 be able to understand and interpret the IP-communication protocol between the NFC readers 60 and the legacy student ID server 20.

FIG. 5C depicts yet another integration approach for the ISID system. Here, application programming interfaces (APIs) into the existing legacy system are utilized to expose the tag ID and reader ID data read events to the ISID server 100. Thus, in FIG. 5C, at step 540, when the NFC tag 70 provides the tag ID to the NFC reader 60, at step 542, the NFC reader 60 transmits the tag ID and reader ID as IP data packets directly to the legacy student ID server 20. Upon receipt of the tag ID and reader ID at the legacy student ID server 20, at step 544, the legacy student ID server 20 processes the tag ID and reader ID to provide legacy services, such as enabling the student to make a purchase or opening a campus door.

Thereafter, at step 546, the legacy student ID server 20 provides the tag ID and reader ID to the ISID server 100. For example, the ISID server 100 can periodically poll the legacy student ID server 20 for tags events, or can asynchronously receive the tag events as they occur in real-time. Again, once the tag ID and reader ID are received by the ISID server 100, at step 548, the ISID server 100 determines the parameters of the content to be provided to the mobile device 130 based on the tag ID and reader ID. Thereafter, at step 550, the ISID server 100 may optionally communicate with the legacy student ID server 20 to retrieve any data necessary for the content, and at step 552, the ISID server 100 provides the content to the mobile device 130.

Figure 6:
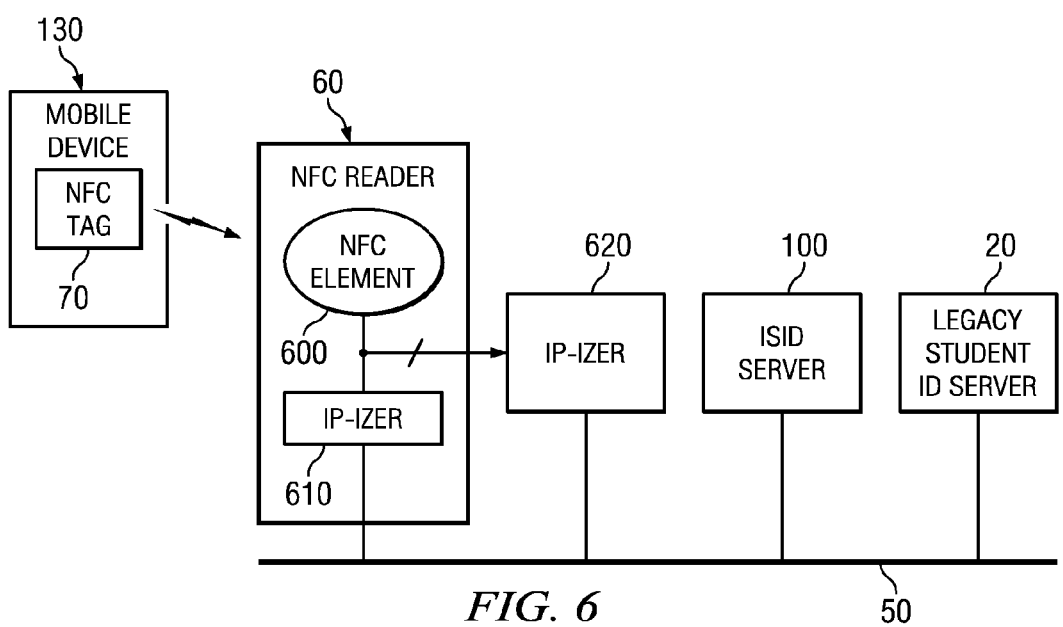
FIG. 6 illustrates yet another exemplary mechanism for integrating the interactive student ID server within a legacy student ID system, in accordance with embodiments of the present invention.

FIG. 6 illustrates yet another exemplary mechanism for integrating the interactive student ID server within a legacy student ID system, in accordance with embodiments of the present invention. FIG. 6 depicts another integration scheme whereby splitting of the reader's serial data is utilized. This mechanism exploits the fact that in most campus installations, the IP-based NFC reader 60 is actually formed of two pieces: the NFC reader element 600 that communicates over a serial cable via serial clock/data or Weigand protocols, and another element (IP-Izer 610) that converts the serial data to IP protocol, or "IP-izes" this serial data for transmission to the legacy student ID server 20 via the LAN 50.

In this integration mechanism, the serial data between the NFC reader element 600 and the IP-izer 610 is split, and is sent in parallel to a second IP-izer element 620 (having a known IP protocol as its output), which in turn then forwards its IP data (tag ID and reader ID) to the ISID server 100. By utilizing a separate IP-izer 620 for the ISID sever 100, the ISID server 100 does not need to decode any private protocol to/from the legacy student ID system, which may be unknown or encrypted.

Figure 7A:
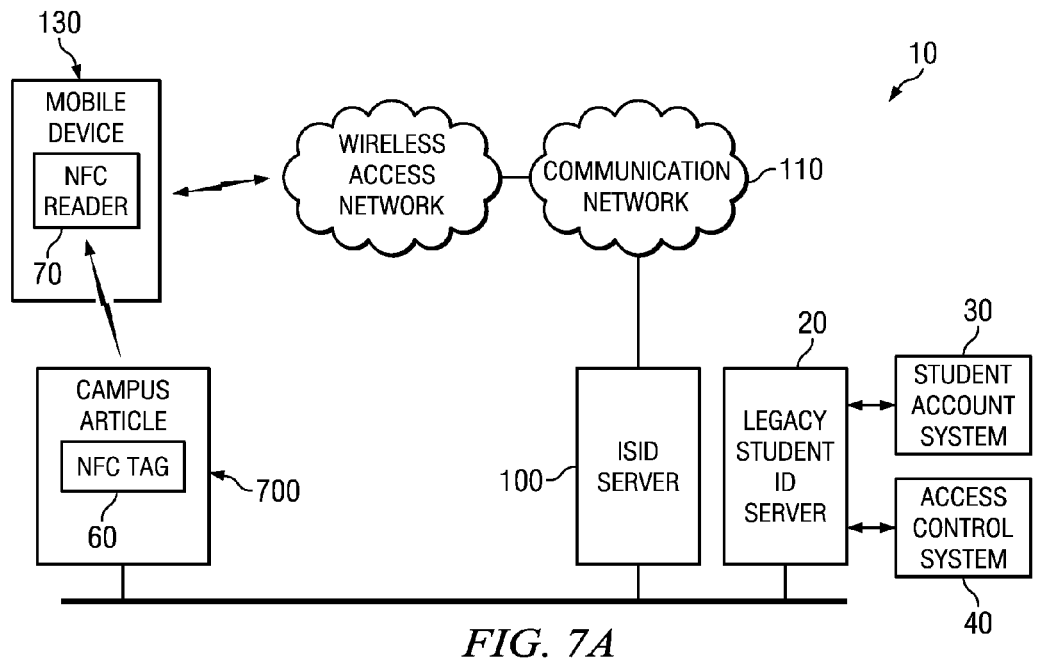
FIG. 7A illustrates another exemplary interactive student ID system, in accordance with embodiments of the present invention.

FIG. 7A illustrates another exemplary interactive student ID system 10, in accordance with embodiments of the present invention. In FIG. 7A, the NFC reader 70 is embedded in the mobile device 130, and the NFC tags 60 are placed on or nearby campus articles 700, such as door controllers or point-of-sale terminals. In this embodiment, the NFC reader 70 within the mobile device 130 communicates with the NFC tag 60 on the campus article 700 to retrieve the tag ID of the NFC tag 60. The mobile device 130 then communicates the tag ID and reader ID to the ISID server 100, which in turn passes this data to the legacy student ID server 20 either via APIs, or by emulating reader IP protocol. The legacy ID server 20 in turn consults its systems 30 and/or 40 with the tag ID and reader ID indices to provide legacy services, such as door opening and purchases. For point-of-sale systems, the terminal can also provide a sale amount (cost of goods/services to be purchased by student) to the NFC reader 70 as either part of the tag ID or as data in addition to the tag ID.

The ISID server 100, as before, utilizes the tag ID and reader ID (and other information provided by the NFC reader 70) to determine content to be provided to the mobile device 130 and delivers the content to the mobile device 130 via the wireless access network 120, possibly via the communication network 110. By including the NFC reader 70 within the mobile device 130, such a next-generation mobile device 130 is automatically awakened by the triggering action of the internal NFC reader 70, and does not necessarily need to rely on the service provider network for timely asynchronous event delivery. In other words, when an NFC communication occurs using the next-generation mobile device 130, the mobile device 130 pulls information from the network, in contrast to present-generation mobile devices which require the network to push information.

Figure 7B:
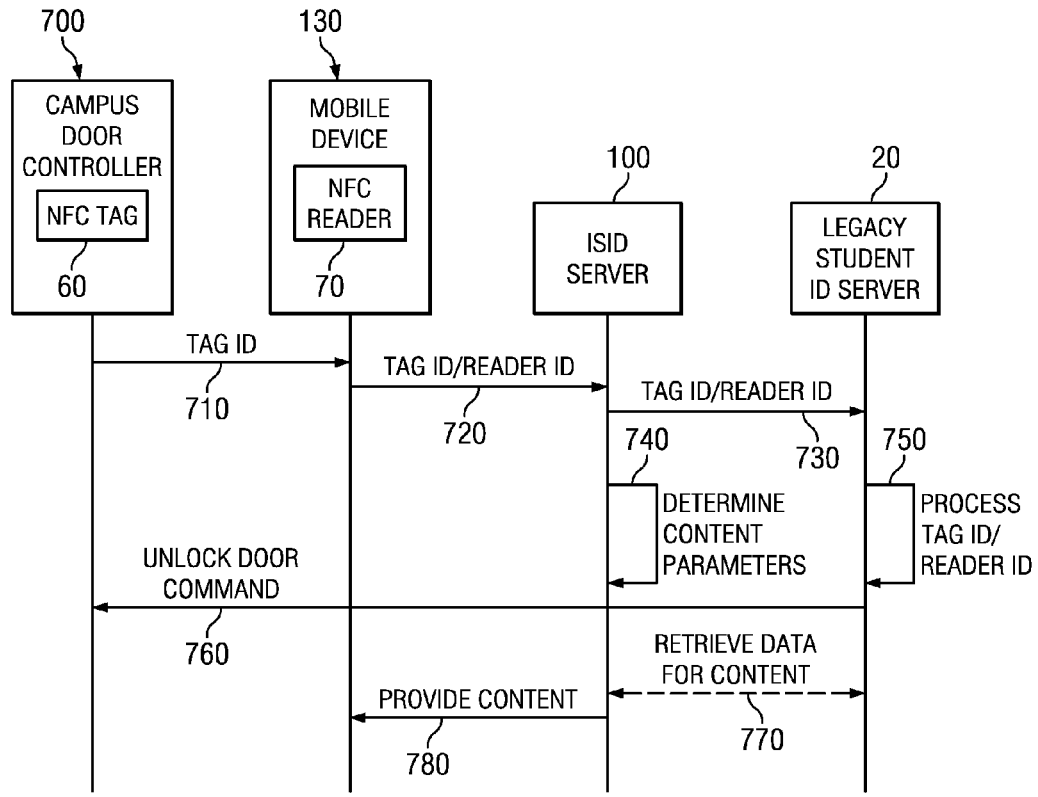
FIG. 7B illustrates an exemplary operation of the interactive student ID system, in accordance with embodiments of the present invention.

FIG. 7B illustrates an exemplary operation of the interactive student ID system, in accordance with embodiments of the present invention. In FIG. 7B, the NFC reader 70 is integrated with the mobile device 130 of the student and the NFC tag 60 is coupled to a campus door controller 700 that is coupled to the legacy student ID server 20 via the LAN.

Thus, in FIG. 7B, at step 710, when the NFC tag 60 on the door controller 700 provides the tag ID to the NFC reader 70 on the mobile device 130, at step 720, the mobile device 130 transmits the tag ID and reader ID to the ISID server 100 via the wireless access network. At step 730, the ISID server 100 transmits the tag/reader ID data to the legacy student ID server 20. Once the tag ID and reader ID are received by the ISID server 100, at step 740, the ISID server 100 determines the parameters of the content to be provided to the mobile device 130 based on the tag ID and reader ID.

In addition, once the tag ID and reader ID are received by the legacy student ID server 20, at step 750, the legacy student ID server 20 processes the tag ID and reader ID to determine if the door controlled by the door controller 700 should be opened. If so, at step 760, the legacy student ID server 20 commands the door controller 700 to open the door.

At step 770, the ISID server 100 may communicate with the legacy student ID server 20 to retrieve any data necessary for the content. For example, the ISID server 100 may communicate with the legacy student ID server 20 to determine whether door access was granted and to formulate the content based on whether or not the door was opened. Once the content has been completed, at step 780, the ISID server 100 provides the content to the mobile device 130.

Although embodiments of the present invention have been described as being applicable to a student ID system, it should be understood that the present invention is also applicable to many other types of campuses, such as hospitals and corporations that use ID cards for legacy access control, purchasing and/or other ID-related services.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

The invention claimed is:

1. An interactive identity (ID) server, comprising:
an interface coupled to a network to receive a tag ID of a near field communication (NFC) tag and a reader ID of an NFC reader in communication with the NFC tag, one of the NFC tag and NFC reader being on a mobile device of a user, the interface further coupled to the network to communicate with a legacy ID server, the legacy ID server further receives the tag ID and the reader ID and authorizes the user's access to an area based on the tag ID and the reader ID; and
a processor coupled to the interface to receive the tag ID and the reader ID and operable to determine content related to the area based on the tag ID and the reader ID and enable the content determined to be related to the area to be delivered to the mobile device based on an indication received from the legacy ID server that the user is authorized to access the area.

2. The interactive ID server of claim 1, wherein the interface includes:
an external interface coupled to a wireless access network for communicating with the mobile device;
wherein the processor is operable to communicate the content determined to be related to the area to the mobile device over the wireless access network via the external interface.

3. The interactive ID server of claim 1, wherein the network is a local area network (LAN).

4. The interactive ID server of claim 1, wherein the interface is operable to receive the tag ID and the reader ID from the NFC reader via the network.

5. The interactive ID server of claim 1, wherein the interface is operable to intercept the tag ID and the reader ID transmitted from the NFC reader to the legacy ID server and to relay the tag ID and the reader ID to the legacy ID server via the network.

6. The interactive ID server of claim 1, wherein the interface is operable to receive the tag ID and the reader ID transmitted from the NFC reader to the legacy ID server via sniffed data packets from the network.

7. The interactive ID server of claim 1, wherein the interface is operable to receive the tag ID and the reader ID from the legacy ID server, the legacy ID server transmitting the tag ID and the reader ID to the interactive ID server upon reception thereof from the NFC reader.

8. The interactive ID server of claim 2, wherein the NFC reader is located on the mobile device and the external interface is operable to receive the tag ID and the reader ID from the mobile device via the wireless access network.

9. The interactive ID server of claim 8, wherein the processor is configured to provide the tag ID and the reader ID received from the mobile device to the legacy ID server over the network via the interface.

10. The interactive ID server of claim 1, wherein:
the processor is further operable to determine parameters for the content from the tag ID and the reader ID and to identify data satisfying the parameters for inclusion in the content; and
the interface is operable to retrieve at least a portion of the data from the legacy ID server over the network.

11. The interactive ID server of claim 1, wherein the content is communicated to the mobile device via at least one of a telephone call, short message system (SMS) message or a data push notification message.

12. The interactive ID server of claim 11, wherein the content includes a recorded message related to the area that is communicated to the mobile device via the telephone call and the processor is further operable to establish the telephone call between the mobile device and a recorder configured to play the recorded message during the telephone call.

13. The interactive ID server of claim 11, wherein the content includes a uniform resource locator (URL) of a website containing additional information that is communicated to the mobile device via an SMS message or a data push notification message by the processor.

14. A mobile device providing interactive identity (ID) services, comprising:
a first near field communication (NFC) device in communication with a second near field communication (NFC) device to enable a tag ID and a reader ID to be provided to an interactive ID server and legacy ID server, each being coupled to a local area network, one of the first NFC device and the second NFC device being an NFC tag having the tag ID and the other of the first NFC device and the second NFC device being an NFC reader having the reader ID, the legacy ID server authorizing a user of the mobile device access to an area based on the tag ID and the reader ID;
a transceiver coupled to a wireless access network to receive content related to the area based on the user of the mobile device being granted access to the area, the interactive ID server determining the content related to the area based on the tag ID and the reader ID; and
a processor coupled to the transceiver to process the content determined to be related to the area and provide the content to the user of the mobile device.

15. The mobile device of claim 14, wherein:
the first NFC device is the NFC reader and the second NFC device is the NFC tag;
the first NFC device is operable to receive the tag ID from the NFC tag; and
the processor is operable to transmit the reader ID of the NFC reader and the tag ID of the NFC tag to the interactive ID server via the transceiver and the wireless access network.

16. The mobile device of claim 15, wherein the mobile device further includes a memory maintaining an interactive ID application and the processor is coupled to the memory to execute instructions of the interactive ID application to transmit the reader ID of the NFC reader and the tag ID of the NFC tag to the interactive ID server and to process the content related to the area received from the interactive ID server.

17. The mobile device of claim 15, wherein the transceiver is configured to receive the content via one or more of a telephone call, short message system (SMS) message or a data push notification message, and the content includes one or more of a recorded message, a uniform resource locator (URL) of a website and data.

18. A method for dynamic delivery of content to a mobile device, the method comprising:
receiving a tag identity (ID) of a near field communication (NFC) tag and a reader ID of an NFC reader in communication with the NFC tag at an interactive ID server, one of the NFC tag and the NFC reader being on the mobile device;
communicating with a legacy ID server that further receives the tag ID and the reader ID and authorizes a user of the mobile device access to an area based on the tag ID and the reader ID;
determining content related to the area based on the tag ID and the reader ID; and
enabling the content determined to be related to the area to be delivered to the mobile device based on an indication received from the legacy ID server that the user is authorized to access the area.

* * * * *